(12) United States Patent
Perlo et al.

(10) Patent No.: US 6,554,455 B2
(45) Date of Patent: Apr. 29, 2003

(54) LIGHTING DEVICE, PARTICULARLY A MOTOR VEHICLE LIGHT

(75) Inventors: Piero Perlo, Sommariva Bosco (IT); Davide Capello, Turin (IT); Denis Bollea, Fiano (IT); Piermario Repetto, Turin (IT); Daniele Pullini, Venaria (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 10/145,759

(22) Filed: May 16, 2002

(65) Prior Publication Data

US 2002/0172045 A1 Nov. 21, 2002

(30) Foreign Application Priority Data

May 18, 2001 (IT) ...................................... TO2001A0462

(51) Int. Cl.$^7$ .................................................. F21V 7/00
(52) U.S. Cl. ........................ 362/297; 362/346; 362/517; 362/341; 362/347; 362/350
(58) Field of Search ................................. 362/297, 346, 362/517, 341, 347, 350

Primary Examiner—Sandra O'Shea
Assistant Examiner—Mark Tsidulko
(74) Attorney, Agent, or Firm—Sughrue Mion, PLLC

(57) ABSTRACT

A lighting device, particularly a motor vehicle light, having a primary reflector (2) composed of a hollow body that defines a pair of pointed elements (4, 5), which face opposite directions, between which a luminous source (1) is placed; and a secondary reflector composed of an elongated element (3) with steps (6), at whose centre the primary reflector (2) is placed with its relative pointed elements (4, 5) facing the steps (6).

4 Claims, 1 Drawing Sheet

LIGHTING DEVICE, PARTICULARLY A MOTOR VEHICLE LIGHT

FIELD OF THE INVENTION

The present invention relates to lighting devices of the type that comprise a luminous source, a primary reflector and a secondary reflector.

SUMMARY OF THE INVENTION

The purpose of this invention is to implement a lighting device of the type described above, which is especially designed for use inside a motor vehicle light, more specifically, inside the "third stop-light", and has a simple, compact structure, which is nevertheless capable of providing high performance.

According to the invention, the lighting device is essentially characterized in that:

- the primary reflector is composed of a hollow body that defines a pair of ellipsoid-shaped pointed elements, which face in opposite directions to each other, between which a luminous source is placed,
- said luminous source consists of a filament lamp,
- the secondary reflector comprises an elongated element with steps, at whose centre said primary reflector is placed with the above pointed elements facing the steps.

As explained previously, according to the invention, the shape of the lighting device makes it especially suitable for application to the rear light, or "third stop-light" of motor vehicles. In this application, the lighting device is normally made complete by a transparent plate for diffusing the luminous beam produced by the primary and the secondary reflectors.

BRIEF DESCRIPTION OF THE DRAWINGS

The invention is described below in detail, with reference to the attached drawings, which are provided by way of example in a non-limitative manner, in which.

DETAILED DESCRIPTION OF THE INVENTION

Figure 1:
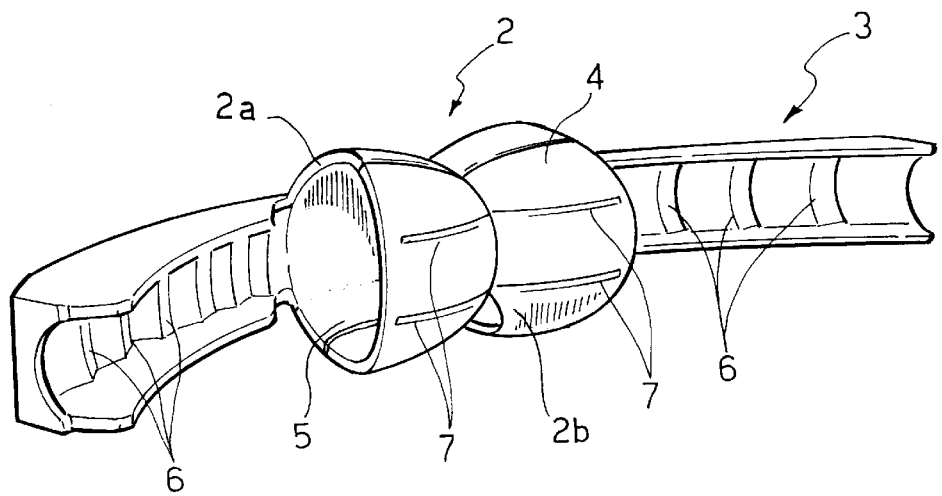
FIG. 1 shows a schematic perspective view of a lighting device in conformity with the invention.
Figure 2:
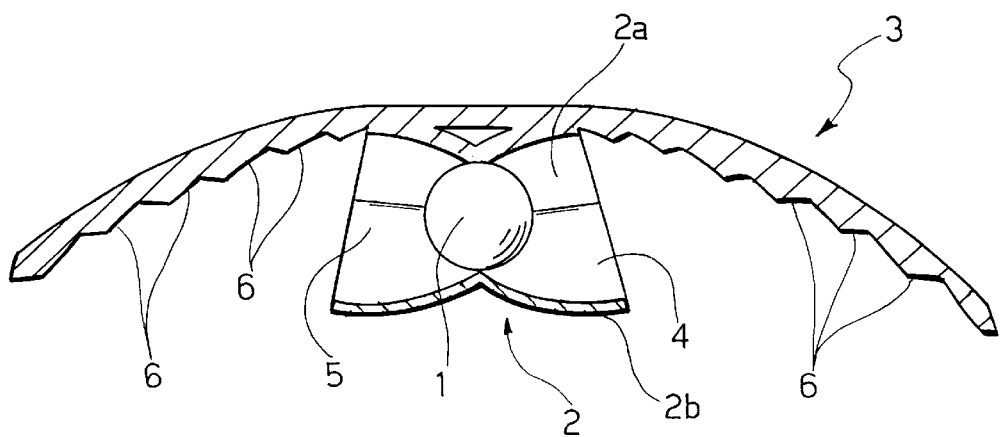
FIG. 2 shows a lengthwise sectional view of FIG. 1.

With reference to the drawings, in conformity with the invention, the lighting device comprises a luminous source 1, made up of an incandescent, or filament lamp, for example, of the P21 type, which is used in the motor vehicles sector, and which is placed between a primary reflector 2 and a secondary reflector 3.

The primary reflector 2 consists of a hollow body with double ellipsoid shape, which defines two essentially pointed elements facing in opposite directions 4,5, in the area where both are joined, on which the lamp 1 is placed, so that it is hidden from view on the outside.

The primary reflector 2 is suitably composed of a first portion 2a, which is incorporated into the secondary reflector 3, thus composing a single piece of moulded plastic material; and of a second portion 2b, which is connected to the first portion so as to allow it to be detached from the device, and serves to expose the filament lamp 1 and make it accessible. The detachable connection between portions 2a and 2b, which is not shown in detail in the drawings as technicians in this sector are familiar with it, may be for example of the jointed or snap-on type.

The secondary reflector 3 is composed of an elongated element, i.e. whose dimensions are larger longitudinally than they are vertically, by the centre of which the primary reflector 2 is placed. The connection between both reflectors 2,3 is rigid, and the reflectors may be composed of a single piece if they are made of moulded plastic.

The surface of the secondary reflector 3, which is placed on the side of the primary reflector 2, consists of a plurality of stepped segments 6, towards which the pointed elements 4 and 5 are turned.

Said pointed elements 4,5 may be formed on the back, i.e. opposite the secondary reflector 3, by respective slits 7.

The device is completed by a transparent element, not shown, which is placed at the front of reflectors 2 and 3. Said transparent element will be equipped, as is in itself known, with micro-optic diffusers for angular control of the luminous beam going out of the lighting device.

During operation, the light produced by the luminous source 1 is mostly collected, in a controlled manner, by the primary reflector 2 and aimed by the surfaces of the two pointed elements 4,5, towards the secondary reflector 3. The latter extracts the light going out of the primary reflector and focuses it on a transparent element (not shown in the drawings), which is normally placed in front of the reflectors 2,3, as already stated, to complete the lighting device.

The pitch, i.e. the distance between the steps 6 of the secondary reflector 3, may vary, and in any case, is such as to cast a uniform light on the transparent element.

Any slits 7 located on the back surface of the two pointed elements 4,5 of the primary reflector 2 serve to cast a direct light at the centre of the transparent element, in order to heighten the effect whereby the primary reflector 2 appears hidden from the outside.

Naturally, the construction details and the implementation methods can vary extensively with respect to what is described and illustrated without, for this reason, going beyond the scope of this invention, as is defined in the claims that follow.

What is claimed is:

1. A lighting device, particularly a motor vehicle light, comprising a luminous source (1), a primary reflector (2) and a secondary reflector (3), wherein:

the primary reflector (2) is composed of a hollow body that defines a pair of ellipsoid-shaped pointed elements (4,5), which face in opposite directions to each other, and between which a luminous source (1) is placed;

said luminous source consists of a filament lamp (1);

the secondary reflector is composed of an elongated element (3) with steps (6), by whose centre is placed said primary reflector (2) with said pointed elements (4,5) facing said steps (6).

2. Lighting device according to claim 1, wherein said pointed elements (4,5) of the primary reflector (2) are formed by respective slits (7) on the opposite side of said secondary reflector (6).

3. Lighting device according to claim 1, wherein said steps (6) of the secondary reflector (3) are arranged at different distances.

4. A lighting device according to claim 1, wherein said hollow body (2), which defines said pair of pointed elements (4,5), is composed of a first portion (2a) that is incorporated into said secondary reflector (3); and of a second portion (2b) that can be detached from the device so that said filament lamp (1) is exposed.

* * * * *